United States Patent [19]

Kalina et al.

[11] 3,821,080

[45] June 28, 1974

[54] EXTRACTION OF PROTEINS FROM MICROORGANISM CELLS

[75] Inventors: Vladimir Kalina, Lausanne; Pierre Nicholas, La Tour-De-Peilz, both of Switzerland

[73] Assignee: Societe D'Assistance Technique Pour Produits Nestle S.A., Lausanne, Switzerland

[22] Filed: June 12, 1972

[21] Appl. No.: 262,145

[30] Foreign Application Priority Data

June 25, 1971 Switzerland ........................ 9318/71

[52] U.S. Cl. .................. 195/5, 260/112 R, 426/204

[51] Int. Cl. .......................... A23j 1/18, C07g 7/00

[58] Field of Search .......... 99/14, 9; 195/28 R, 3 H; 260/112 R; 426/204; 195/5

[56] References Cited

UNITED STATES PATENTS

| | | | |
|---|---|---|---|
| 3,268,412 | 8/1966 | Champagnat | 99/14 X |
| 3,585,179 | 6/1971 | Samejima | 99/14 X |
| 3,634,194 | 1/1972 | Frankford | 195/1 X |
| 3,718,541 | 2/1973 | Kalina | 195/28 R |

*Primary Examiner*—A. Louis Monacell
*Assistant Examiner*—James Robert Hoffman
*Attorney, Agent, or Firm*—Watson, Leavenworth, Kelton & Taggart

[57] ABSTRACT

Proteins are extracted from microorganism cells by mechanical rupture under strongly alkaline conditions.

22 Claims, No Drawings

EXTRACTION OF PROTEINS FROM MICROORGANISM CELLS

This invention is concerned with the treatment of microorganism cells.

There exists a growing interest in new sources of protein, and microbial cells, notably of yeasts and bacteria, constitute one protein source which is presently the object of numerous developments.

Recovery or extraction of the protein contained in microorganism cells may be carried out in various ways, the best known being enzymatic treatment, mechanical rupture of the cell wall and chemical extraction by means of acid or alkaline agents. Although each of these techniques has particular advantages in certain contexts, the requirements imposed on food grade products are such that processes having a certain technological value become somewhat less attractive for economic reasons. Thus, for example, microorganism cells may be ruptured mechanically in various ways but the yields of solubilised material remain relatively low, even after prolonged periods of treatment. Moreover, since microorganism cells contain variable amounts of nucleic acids, the presence of which in high concentrations is undesirable for human consumption, work has been carried out in order to reduce the content of these acids to acceptable levels.

The present invention provides a process for extracting proteins from microorganism cells which comprises rupturing the cells by mechanical disintegration in a strongly alkaline medium and thereafter recovering the extracted proteins.

Preferably, the pH of the medium is at least 10 for yeasts and at least 11 for bacteria, as at these values the cell wall is considerably weakened so that it may be ruptured much more easily. In carrying out the process, the pH of the cell suspension is adjusted to the desired value by the addition of an alkali and the cells are then subjected to mechanical rupture. This operation may be carried out in various ways and with various devices such as, for example, a conventional homogeniser, a ball homogeniser, cell disintegrator, etc. Rupture of the cell walls may also be obtained by subjecting the cells to a sudden pressure drop or by exposure to ultrasonic waves.

The particular techniques which may be used to obtain cell rupture are well known to the man skilled in the art and consequently it is not necessary to describe them in detail. It should be noted that the treatment according to the invention is effective irrespective of the mechanical means used for fragmentation of the cells.

The concentration of cells in suspension subjected to mechanical rupture, which may vary within relatively wide limits, is dependent on practical considerations. Thus, operation of the process starting from very dilute suspensions implies the movement and treatment of large amounts of liquid whereas the treatment of highly concentrated media, of the order of 15 to 20 percent by weight cell dry matter for example, presents certain difficulties due notably to the viscosity of the suspension. In practice, the level of concentration is generally between 1 and 15 percent of cell dry matter and, preferably, the concentration is adjusted to between 5 and 10 percent by weight. In the production of microorganism cells by fermentation, the cell concentration of the broth is normally between 1 and 3 percent of biomass dry matter. It is therefore advantageous to concentrate the fermentation medium before adjusting the pH for the mechanical rupture treatment, and this concentration may be carried out by centrifugation, decantation or evaporation for example. If the suspension is concentrated by centrifugation, it may be advantageous first of all to acidify the medium, for example to a pH value not exceeding about 3 with optional heating between 40° and 100° C, in order to aggregate the cell mass and facilitate separation.

The mechanical treatment is carried out at a pH value which is generally chosen having regard to the nature of the microorganism and the contemplated use of the cell product. If the latter is destined for the food industry, a pH above 12 is not desirable because excessively alkaline conditions tend to degrade the nutritive properties of the protein. On the other hand, for industrial applications, such as the production of adhesives or resins, alkali concentrations imparting high pH values to the medium may be advantageous, the effect of the mechanical treatment being generally increased and the rupture of the cell walls appreciably facilitated.

Temperature conditions may also influence the results of the abovementioned mechanical treatment and, here also, the specific parameters are selected taking into account the final use of the protein. As a combination of high alkali concentrations and high temperatures provokes degradation of the protein, it is preferable to avoid carrying out the treatment at temperatures distinctly above ambient temperature, for example 18° to 25° C, if the product is destined for human consumption. The treatment may however be carried out at higher temperatures if the protein is used for other applications.

Effective rupture of the cells may conveniently be accomplished under pressure by means of a homogeniser of the type generally used in the food industry. The pressure may vary between 200 and 700 kg/cm$^2$; it is determined with regard to the treatment conditions and the degree of degradation to be obtained. In general, the process according to the invention permits operation at lower pressures than those necessary to obtain, by conventional means, an equivalent degree of solubilisation.

The mechanical rupture operation may be preceded, depending on the intended use of the cell material, by an acid or enzymatic hydrolysis of the cells in order to solubilise the nucleic acids. It is advantageous, however, to carry out such a hydrolysis after the rupture of the cells, their contents being at that time more accessible to attack by an acid or enzymes.

The mass of treated cells, that is after mechanical rupture of the cell walls, may be used, as stated above, for the production of a varied range of products. The fragments of the cell walls may, for example, be separated by centrifugation and the soluble protein isolate recovered from the alkaline solution by precipitation with an acid. Alternatively, the protein may also be subjected to an enzymatic hydrolysis to obtain low molecular weight peptides, which are then recovered using an appropriate technique (precipitation, separation, washing, etc.).

It has been found that the ruptured cell mass, and more particularly a bacterial biomass, may be spun directly after the treatment according to the invention in order to produce protein fibres. Such fibres, although containing fragments of cell walls, may nevertheless be oriented by stretching whereas it is hardly possible to produce fibres of satisfactory quality by spinning a biomass containing intact cells. Finally, the protein may also be used for the preparation of extruded textured products, protein-based resins or adhesives.

The invention is illustrated by the following examples; the percentages are by weight.

EXAMPLE 1

A fermentation broth containing 1.5 percent of dry cell matter obtained by culture of Micrococcus cerificans in a medium comprising ethanol as carbon source is acidified to pH 1 with sulphuric acid. The mixture is heated for 30 minutes at 90° C, the suspension is cooled to about 20° C and then concentrated by centrifugation to obtain a biomass having a 6.5 percent dry cell matter. Sodium hydroxide (2N) is then added to 50 ml aliquots of concentrated suspension, in order to provide a series of samples having respectively a pH of 3.5; 5.0; 7.0; 9.5; 11 and 12.

Each of these samples is treated by means of a Braun apparatus with 30 ml of glass beads of 0.1 to 0.11 mm, for 1 minute, a period of time sufficient to obtain only a partial rupture of the cells under normal conditions. After 60 minutes' stirring at 20° C at different pH values, the proportions (expressed in percent of liberated protein indicated in the table below are obtained:

| pH during treatment | solubilised protein (%) | | | |
|---|---|---|---|---|
| | pH 7 | pH 9 | pH 11 | pH 12 |
| 3.5 | 3.5 | 6.0 | 15.8 | 31.2 |
| 5.0 | 3.6 | 5.8 | 14.6 | 33.2 |
| 7.0 | 4.8 | 5.5 | 14.2 | 29.2 |
| 9.5 | 7.0 | 8.2 | 16.3 | 34.2 |
| 11.0 | 8.3 | 10.2 | 20.0 | 34.0 |
| 12.0 | 12.0 | 16.2 | 33.2 | 42.2 |

The results shown in this table demonstrate that mechanical rupture of the cells at a pH of at least 11 provides a higher and unexpected yield of solubilised protein.

EXAMPLE 2

A fermentation broth containing 1.5% of dry cell matter is obtained by culture of Micrococcus cerificans in a medium containing $C_{10}$ to $C_{24}$ linear paraffins as carbon source. This broth is acidified to pH 3 with sulphuric acid and heated for 10 minutes at 70° C. The biomass is concentrated to 7.0 percent dry matter and cooled to about 20° C.

Sodium hydroxide is added to 100 ml aliquots of concentrated broth to provide samples having respectively pH 7 and pH 12. Each of these samples is homogenised by means of a RIBI cell disintegrator, under a pressure of 650 kg/cm². After stirring for 60 minutes at pH 12 and at a temperature of 20° C, the proportion of protein nitrogen recovered from the supernatant of the two samples is respectively 32 and 45 percent.

EXAMPLE 3

A yeast suspension is prepared by culture of Candida lipolytica in a medium containing $C_{10}$ to $C_{24}$ linear paraffins as carbon source. The suspension is centrifuged and ammonium hydroxide is added to 100 ml aliquots of the concentrated suspension, which contains 5 percent of dry cell material, to provide samples having respectively pH 6.5, 10 and 11.

Each sample is treated under identical conditions, at a pressure of 650 kg/cm², in a RIBI cell disintegrator. The pH of the samples is adjusted to 7 by addition of sulphuric acid and the mixtures are then stirred for 60 minutes at 22° C. The proportion of solubilised total nitrogen recovered from the supernatant of the three samples is respectively 49, 60 and 70 percent.

We claim:

1. A process for extracting proteins from microorganism cells which comprises subjecting a suspension of bacterial cells in a medium having a pH of at least 11 to mechanical stress sufficient to rupture said cells and thereafter recovering extracted cellular proteins.

2. A process according to claim 1 in which the pH of the medium is 11 to 12.

3. A process according to claim 2 in which the medium contains 1 to 15 percent by weight cell dry matter and after cell rupture nucleic acids liberated from the cells are solubilised by acid or enzyme hydrolysis.

4. A process according to claim 2 in which the temperature of the suspension medium is between about 18° and 25° C.

5. A process according to claim 1 in which a fermentation broth containing bacterial cells is acidified and the acidified broth is concentrated to a cell dry matter content of 5 to 10 percent by weight preparatory to rupturing said cells and recovering protein therefrom.

6. A process according to claim 5 in which the fermentation broth is acidified to a pH value not exceeding about 3.

7. A process according to claim 5 in which the cells are ruptured by homogenisation.

8. A process according to claim 7 in which the cells are ruptured at a pressure of 200 to 700 kg/cm².

9. A process according to claim 5 in which nucleic acids present in the cells are solubilised by acid or enzymatic hydrolysis.

10. A process according to claim 9 in which solubilisation of nucleic acids is effected after rupture of the cells.

11. A process according to claim 1 in which the cells are ruptured by homogenisation at a pressure of 200 to 700 kg/cm².

12. A process for extracting proteins from microorganism cells which comprises subjecting a suspension of yeast cells in a medium having a pH of at least 10 to mechanical stress sufficient to rupture said cells and thereafter recovering extracted cellular proteins.

13. A process according to claim 12 in which the pH of the medium is 10 to 12.

14. A process according to claim 13 in which the medium contains 1 to 15 percent by weight dry cell matter and after cell rupture nucleic acids liberated from the cells are solubilised by acid or enzyme hydrolysis.

15. A process according to claim 13 in which the temperature of the suspension medium is between about 18° to 25° C.

16. A process according to claim 12 in which the cells are ruptured by homogenisation at a pressure of 200 to 700 kg/cm².

17. A process according to claim 12 in which a fermentation broth containing yeast cells is acidified and the acidified broth is concentrated to a cell dry matter content of 5 to 10 percent by weight preparatory to rupturing said cells and recovering protein therefrom.

18. A process according to claim 17 in which the fermentation broth is acidified to a pH value not exceeding about 3.

19. A process according to claim 17 in which the cells are ruptured by homogenization.

20. A process according to claim 19 in which the cells are ruptured at a pressure of 200 to 700 kg/cm$^2$.

21. A process according to claim 17 in which nucleic acids present in the cells are solubilized by acid or enzymatic hydrolysis.

22. A process according to claim 21 in which solubilization of nucleic acids is effected after rupture of the cells.

* * * * *